United States Patent
Riezu Corpas et al.

(10) Patent No.: US 9,347,850 B2
(45) Date of Patent: May 24, 2016

(54) TESTING METHODS FOR WIND TURBINE BLADES

(75) Inventors: Miguel Riezu Corpas, Sarriguren (ES); Ramon Rojas Diaz, Sarriguren (ES); Ruben Saavedra Bao, Sarriguren (ES)

(73) Assignee: GAMESA INNOVATION & TECHNOLOGY, S. L., Sarriguren (Navarra) (ES)

( * ) Notice: Subject to any disclaimer, the term of this patent is extended or adjusted under 35 U.S.C. 154(b) by 0 days.

(21) Appl. No.: 13/469,450

(22) Filed: May 11, 2012

(65) Prior Publication Data

US 2012/0314201 A1    Dec. 13, 2012

(30) Foreign Application Priority Data

May 16, 2011    (ES) .................................. 201100532

(51) Int. Cl.
| | |
|---|---|
| *G01B 11/16* | (2006.01) |
| *B23P 11/00* | (2006.01) |
| *G01M 5/00* | (2006.01) |
| *F03D 11/00* | (2006.01) |
| *G01M 11/08* | (2006.01) |

(52) U.S. Cl.
CPC ......... *G01M 5/0016* (2013.01); *F03D 11/0091* (2013.01); *G01M 5/0041* (2013.01); *G01M 5/0075* (2013.01); *G01M 5/0091* (2013.01); *G01M 11/083* (2013.01); *F05B 2270/331* (2013.01); *Y02E 10/722* (2013.01); *Y10T 29/49826* (2015.01)

(58) Field of Classification Search
CPC . G01M 11/083; G01M 5/005; G01M 5/0016; G01M 5/0041; G01M 5/0058; G01M 5/0075; G01M 5/0091
USPC ............ 356/32–35; 73/800; 416/61; 415/118
See application file for complete search history.

(56) References Cited

U.S. PATENT DOCUMENTS

| | | | |
|---|---|---|---|
| 6,545,760 B1 | 4/2003 | Froggatt et al. | |
| 2006/0037402 A1* | 2/2006 | Musial et al. ................... | 73/664 |
| 2007/0098551 A1* | 5/2007 | Viertl .............................. | 416/61 |
| 2011/0091321 A1* | 4/2011 | Baker et al. ....................... | 416/1 |
| 2011/0292372 A1* | 12/2011 | Criado Abad et al. .......... | 356/32 |
| 2013/0035878 A1* | 2/2013 | Wesby et al. ................... | 702/42 |
| 2013/0061683 A1* | 3/2013 | Baker et al. ..................... | 73/834 |

FOREIGN PATENT DOCUMENTS

WO    WO 2010086466 A1 *    8/2010    .............. G01M 5/00

* cited by examiner

*Primary Examiner* — Michael A Lyons
*Assistant Examiner* — Dominic J Bologna
(74) *Attorney, Agent, or Firm* — Ladas & Parry LLP

(57) ABSTRACT

Testing method for determining the distribution of a physical property along a wind turbine blade comprising the following steps: a) installing inside the blade a first optical fiber cable (13) along the leading and trailing edges and a second and third centered optical fiber cables (14, 15) at both sides of the blade (9), leaving in them a free end; b) applying one load to the blade (9) in a test bench (10) placed at the blade factory; c) obtaining the strain distribution produced by said load along the blade (9) using a suitable external equipment connected to said free end for measuring the strain using Rayleigh scattered light; d) determining the distribution of said physical property from said strain distribution; e) comparing the distribution of said physical property with its design distribution. The invention also comprises a method of installation of said cables.

18 Claims, 3 Drawing Sheets

US 9,347,850 B2

TESTING METHODS FOR WIND TURBINE BLADES

CROSS REFERENCE TO THE CORRESPONDING APPLICATION

This application claims the benefit of Spanish Patent Application No. P201100532 filed on May 16, 2011, the contents of which are incorporated herein by reference.

FIELD OF THE INVENTION

This invention relates to tests performed to wind turbine blades and, more in particular, to tests using a technology for performing high-spatial resolution distributed strain measurements in optical fibres using Rayleigh scattered light.

BACKGROUND

Current wind turbine blade certification requires performing several static and dynamic tests on the blade to confirm the blade capability to withstand the expected loads, particularly static strength tests to check the blade behaviour under extreme design loads, fatigue tests to check the blade's ability to withstand the operating loads for its design life and other tests in order to characterize physical properties of the blade such as weight, centre of gravity or natural modes and frequencies.

These tests are usually carried out in a test bench in which the blade is bolted to a rigid structure and then static or dynamic loads are applied to the blade by means of different methods.

Most of the currently used test systems rely on a set of strain gauges to determine the strain distribution along the blades. With the increasing size of blades, the amount of necessary gauges is rapidly growing, which implies larger efforts to adequately estimate the aforementioned distribution. With two to four electrical wires per gauge, cabling volume, complexity and vulnerability to electro-magnetic interference become significant and disturbing. Additionally, the discrete nature of this kind of measurements implies loss of information in case of non-linear behaviour in the area between two strain gauges.

WO 2010/086466 in the name of the applicant discloses a strain measuring system of wind turbine blades during the performance of static tests that comprises an equipment for measuring the strain at multiple locations in mono-mode optical fibres using Rayleigh scattered light, that includes an Optical Backscattering Reflectometer (OBR) interrogator, an interface device and an Acquisition System, said mono-mode optical fibres being attached to the blade subjected to said tests for obtaining high spatial resolution measurements of the blade strain during said tests.

There are physical properties of the blade such as the longitudinal mass distribution or the bending stiffness distribution in different zones of the blade that cannot be well characterized using the above mentioned technology based on strain gauges due to its low spatial resolution. On the other side there are not known testing methods with such purpose using the technology disclosed in WO 2010/086466.

However a good knowledge of said physical properties at the manufacturing plant would be very useful in order to establish statistic quality controls over the entire population for detecting local changes of stiffness and/or mass, generated by defects or errors during the production process. It will be also very useful in many other stages of the blades lifetime.

There is therefore a need of new testing methods for determining the physical properties of the blades and this invention is intended to its attention.

SUMMARY OF THE INVENTION

It is an object of the present invention to provide testing methods of physical properties of a wind turbine blade to be performed at the blade factory for quality control purposes.

It is another object of the present invention to provide testing methods of physical properties of a wind turbine blade to be performed outside the blade factory for detecting changes of said physical properties during its lifetime.

It is another object of the present invention to provide a method of installation of cables of a mono-mode optical fiber inside a wind turbine blade so that they can be used during all the wind turbine blade lifetime.

In one aspect, these and other objects are met by a testing method for determining the distribution of a physical property along a wind turbine blade comprising the following steps: a) installing inside the blade a first cable of a mono-mode optical fibre along the leading and trailing edges and a second and third cables of mono-mode optical fibre at both sides of the blade along a central longitudinal section, leaving in said cables a free end for its connection with an external equipment; b) applying one or more loads to the blade in a test bench placed at the blade factory comprising first and second fixed supports and means for rotating the blade; c) obtaining the strain distribution produced by said load or loads along the blade using a suitable external equipment connected to the free end of at least one of said cables for measuring the strain using Rayleigh scattered light; d) determining the distribution of said physical property from said strain distribution; e) comparing the distribution of said physical property with its design distribution.

In embodiments of the present invention, said physical property is the flapping bending stiffness; the blade is placed in said test bench in a flapping position and the load is applied in a blade section between said supports; the strain measures are carried out along said second and third cables. Hereby it is achieved a testing method for obtaining the distribution of the flapping bending stiffness at the end of the blade manufacturing process for quality control purposes.

In embodiments of the present invention, said physical property is the edge bending stiffness; the blade is placed in said test bench in an edge position and the load is applied in a blade section between said supports; the strain measures are carried out along said first cable. Hereby it is achieved a testing method for obtaining the distribution of the edge bending stiffness at the end of the blade manufacturing process for quality control purposes.

In embodiments of the present invention, said physical property is the distribution of the longitudinal mass; the blade is placed in said test bench in a flapping position subjected to its own weight and first strain measures are carried out along said second cable; the blade is turned 180° in said test bench and second strain measures are carried out along said third cable; the longitudinal blade mass distribution is determined from a previously obtained distribution of the flapping bending stiffness and from the first and second strain distributions resulting from said first and second strain measures, taking into account that, with respect to the first distribution, the second distribution is caused by twice the own weight of the blade. Hereby it is achieved a testing method for obtaining the longitudinal mass distribution of the blade at the end of its manufacturing process for quality control purposes.

In embodiments of the present invention, the testing method also comprises (with respect to the flapping bending stiffness test) the following steps: f) applying one load to the blade in a suitable test bench placed outside the blade factory; g) obtaining the strain distribution produced by said load along the blade using a suitable external equipment connected to the free end of said second and third cables for measuring the strain using Rayleigh scattered light; h) determining the distribution of the flapping bending stiffness from said strain distribution; i) comparing said flapping bending stiffness distribution with that determined at the blade factory. Hereby it is achieved a testing method for obtaining the distribution of the flapping bending stiffness outside the blade factory for detecting local changes of the flapping bending stiffness.

In embodiments of the present invention, the testing method also comprises (with respect to the edge bending stiffness test) the following steps: f) applying one load to the blade in a suitable test bench placed outside the blade factory; g) obtaining the strain distribution produced by said load along the blade using a suitable external equipment connected to the free end of said first cable for measuring the strain using Rayleigh scattered light; h) determining the distribution of the edge bending stiffness from said strain distribution; i) comparing said edge bending stiffness distribution with that determined at the blade factory. Hereby it is achieved a testing method for obtaining the distribution of the edge bending stiffness in a blade outside the blade factory for detecting local changes of edge bending stiffness.

In embodiments of the present invention, said steps are performed at any location outside the blade factory before mounting the blade in a wind turbine. Hereby it is achieved a testing method for obtaining the distribution of the flapping or edge bending stiffness for detecting any local change of the flapping or edge stiffness before mounting the blade in a wind turbine.

In embodiments of the invention said steps (outside the blade factory) are performed with the blade mounted in a wind turbine, being therefore the test bench the own wind turbine, using an external device, such as a rope attached to a blade section close to the tip of the blade which is driven by a motor placed on the ground and guided by a pulley fixed to the wind turbine tower, for applying the load in a section close to the tip of the blade. Hereby it is achieved a testing method for obtaining the distribution of the flapping or edge bending stiffness for detecting any local change of the flapping or edge stiffness in a blade mounted in a wind turbine.

In another aspect, the above mentioned objects are met by a method of installation of cables of a mono-mode optical fibre inside a wind turbine blade assembled by bonding an inner spar and two shells, said cables being intended to be used for measuring the strain using Rayleigh scattered light, the method comprising steps of:
   prefixing each of said cables to one of said inner spar and shells by suitable pre-attaching means by the side that will not be used during the blade assembly for disposing the adhesive used for the shell-shell and shell-spar unions;
   disposing said prefixed cables in a manner that assures that they will be fully covered by the adhesive used for the shell-shell and shell-spar unions when the blade is fully assembled with the exception of one of its ends that shall be available for a connection with an external equipment.

In embodiments of the present invention, said prefixing means are drops of a fast curing adhesive means compatible with the adhesive used for the shell-shell and shell-spar unions. Hereby it is achieved an efficient prefixing of said cables.

The invention also comprises the use of said method for installing inside a wind turbine blade a first cable of a mono-mode optical fibre along the leading edge and the trailing edge and second and third cables of mono-mode optical fibre along both sides of the spar leaving the cables with a free end for its connection with an external equipment.

Other features and advantages of the present invention will be understood from the following detailed description in relation with the enclosed drawings.

DETAILED DESCRIPTION OF PREFERRED EMBODIMENTS

Installation of the Optical Fibre

Figure 1:
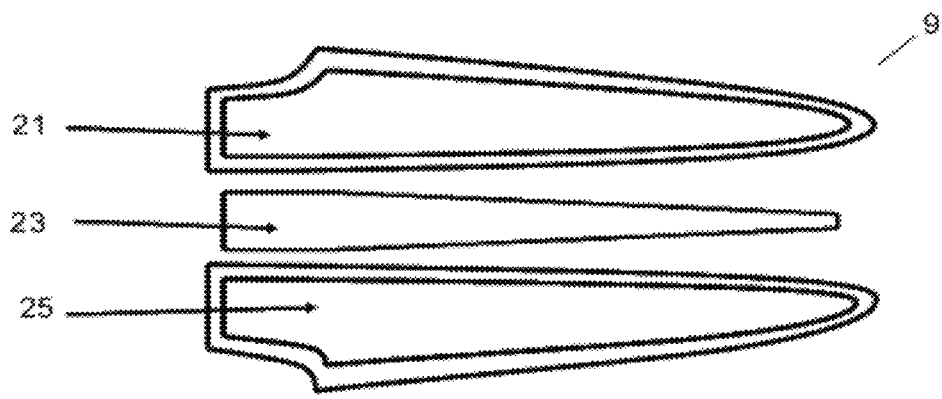
FIG. 1 shows schematically the upper and lower shells and the spar of a typical wind turbine blade that are assembled in the final stage of the blade manufacturing process.

We will describe in the first place a method of installation of a first cable 13 of a mono-mode optical fibre all along the leading and trailing edges of the blade and second and third cables 14, 15 of a mono-mode optical fibre all along both sides of the spar of the blade in connection with the assembly process, using adhesive means, of a wind turbine blade made up of three parts: an upper shell 21, a lower shell 25 and a spar 23, as shown in FIG. 1.

Figure 2:
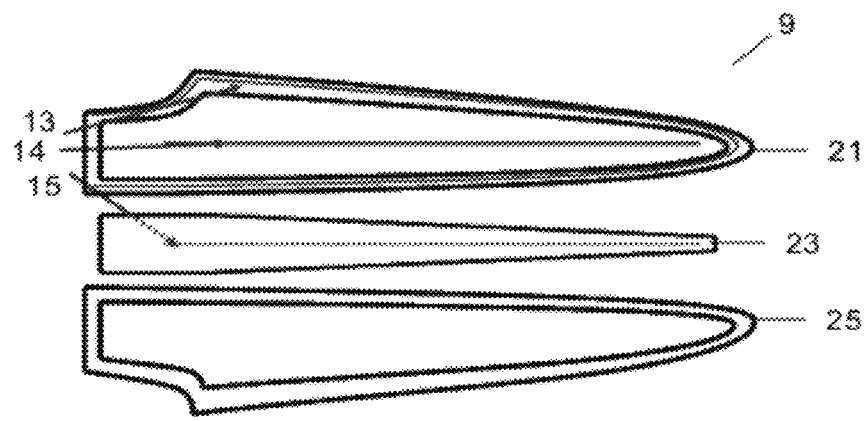
FIGS. 2 and 3 show schematically three optical fibre cables, that are, respectively, deployed and prefixed on the upper shell and on the spar of a wind turbine blade according to the present invention.

In a first step (see FIG. 2) the first and second cables 13, 14 are deployed over, respectively, the leading and trailing edges and the inner central part of the upper shell 21 (that will not stay fixed in the assembly process of the blade) and the third cable 15 (in phantom lines) is deployed on the opposite side of the spar 23 to the side to be attached to the upper shell 21.

Figure 3:
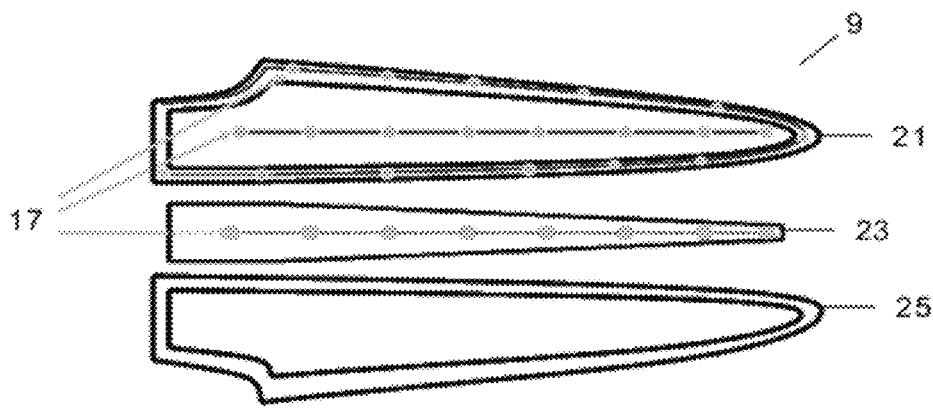

In a second step (see FIG. 3) said three cables 13, 14, 15 are prefixed on the areas where they have been deployed by adding a few drops 17 of a fast-curing adhesive that must be compatible with the slow curing adhesive that is used for the assembly of the blade.

Figure 4:
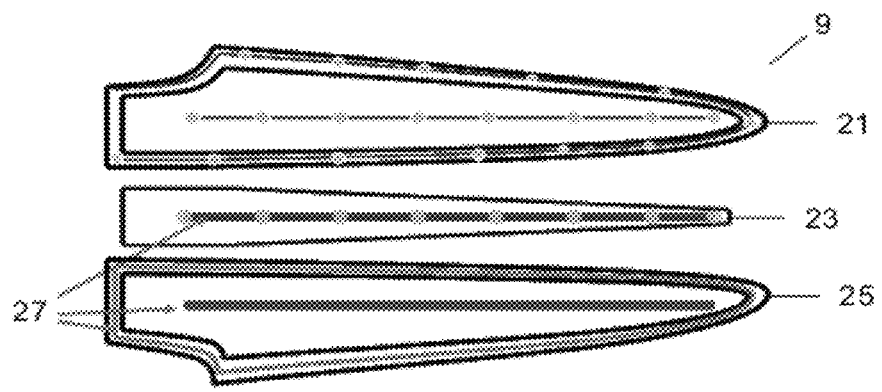
FIG. 4 shows schematically the adhesive applied on the lower shell and on the spar for the shell-shell and shell-spar unions.

While performing the above steps, the slow curing adhesive 27 used for the shell-shell and shell-spar unions is applied on the inner central part and on the leading and trailing edges of the lower shell 25 (that will stay fixed in the assembly process of the blade) and on the side of the spar 23 opposite to that on which it has been prefixed the cable 15 as shown in FIG. 4.

Figure 5:
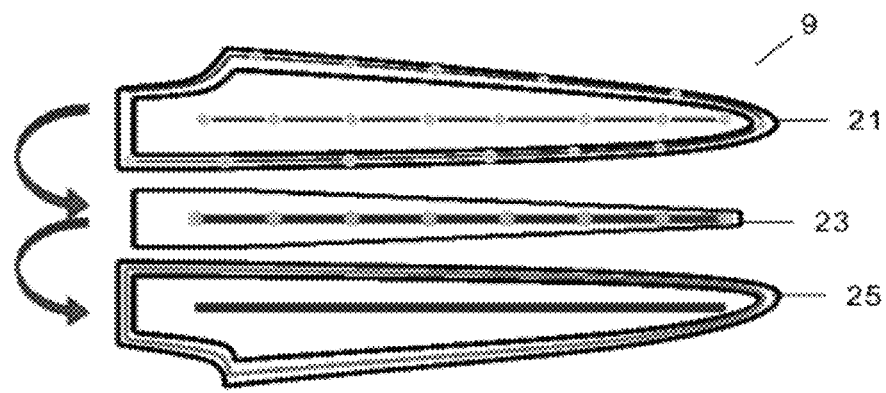
FIG. 5 shows schematically the final stage of the assembly process where the optical fibre cables are embedded into the adhesive used for the shell-shell and shell-spar unions according to the present invention.

Once the fast-curing adhesive 17 applied to the cables 13, 14, 15 has dried enough the typical assembly process of the blade rotating the upper shell 21 and the spar 23 as shown in FIG. 5 can be carried out without moving the cables 13, 14, 15 that, thus, remain embedded into the shell-shell union (cable 13) and into the shell-spar unions (cables 14, 15).

The cables 13, 14, 15 shall have a free end that can be taken out from the blade for a connection to the OBR through, for example, the hole of the lightning rod, the hole of the spar or any other suitable hole.

Testing Methods

With the three cables 13, 14, 15 of mono-mode optical fibre installed in a wind turbine blade as explained above several tests involving strain measurements can be performed during the blade lifetime.

Said strain measurements are made using a known technology for effecting high-spatial resolution distributed strain measurement in optical fibres using Rayleigh scattered light and particularly in an unaltered, commercial grade, mono-mode optical fibre at multiple locations by measuring the local shift in the Rayleigh spectral shift. Specifically, said technology effects a comparison of the spectrum before and after loading the fibre using a complex cross-correlation of the spectra corresponding to load and zero-load conditions. This technology currently allows achieving a strain resolution in the range of ±1με and a spatial resolution of at least 0.5 mm. Further information about this technology can be found in U.S. Pat. No. 6,545,760.

Apart from those static test required for the certification of the blade, new tests for determining physical properties of the blade can be carried out such as the tests for determining the longitudinal stiffness distribution and the longitudinal mass distribution according to the present invention that will now be described.

Bending Stiffness Distribution Tests

Once the assembly has ended and before carrying out the finishing steps (painting) of the manufacturing process it could be performed a test addressed to obtain the bending stiffness distribution of the blade 9 in a suitable test bench 10 as follows.

Figure 7:
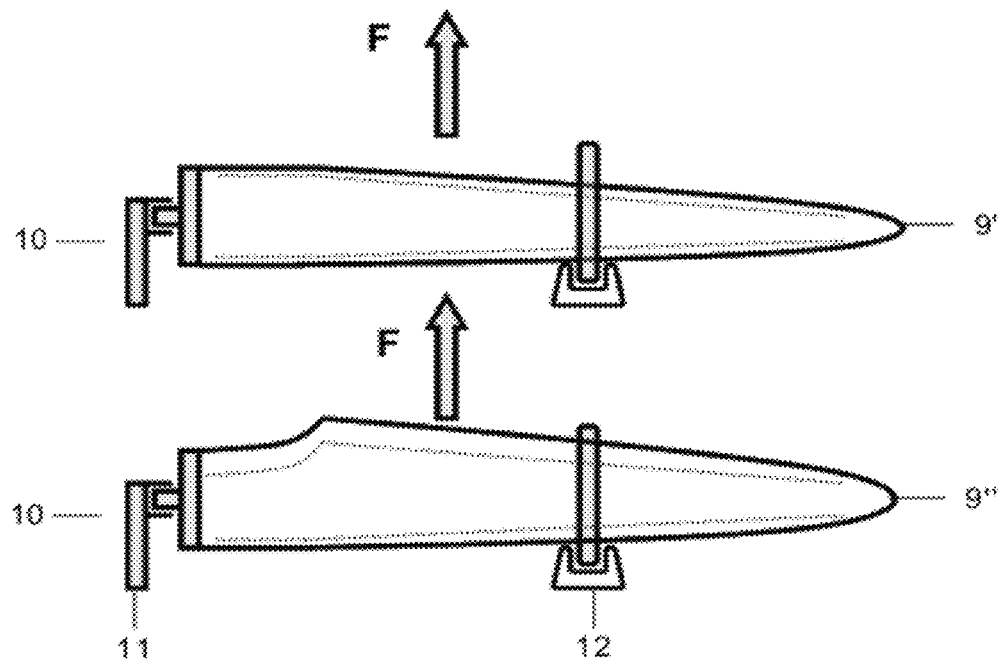
FIG. 7 shows the test bench used in the bending stiffness tests according to the present invention.

With the blade placed in the test bench 10 attached to two fixed supports 11, 12, whether in the flapping direction 9' or in the edge direction 9", it is subjected to a force F (see FIG. 7) and the strains caused by it are measured along the cables 14, 15 for the strains in the flapping direction and along the cable 13 for the strains in the edge direction. The distribution of the bending stiffness is deduced from the calculated distribution of moments in each point of the blade 9 and from the value of the measured strains.

These tests therefore provide experimental flapping and edge bending stiffness distribution at the blade factory which can be compared with the corresponding design values so it will be possible to detect significant changes compared to the expected values due to defects or errors during the manufacturing process.

The same tests can be performed at any stage before mounting the blade in a wind turbine and also with the blade mounted in the wind turbine. As for the tests performed at the blade factory, the distribution of bending stiffness can be deduced from the calculated distribution of moments in each point of the blade according to the value and position of the load applied to the blade and from the value of the measured strains. Then they are compared with the distribution of bending stiffness obtained at the blade factory in order to detect any significant change due in the first case to the transportation and mounting process or to the wind turbine operation in the second case. Through these comparisons it is possible to identify and locate possible losses of stiffness in order to take remedial actions before they cause the failure of the blade.

Figure 8:
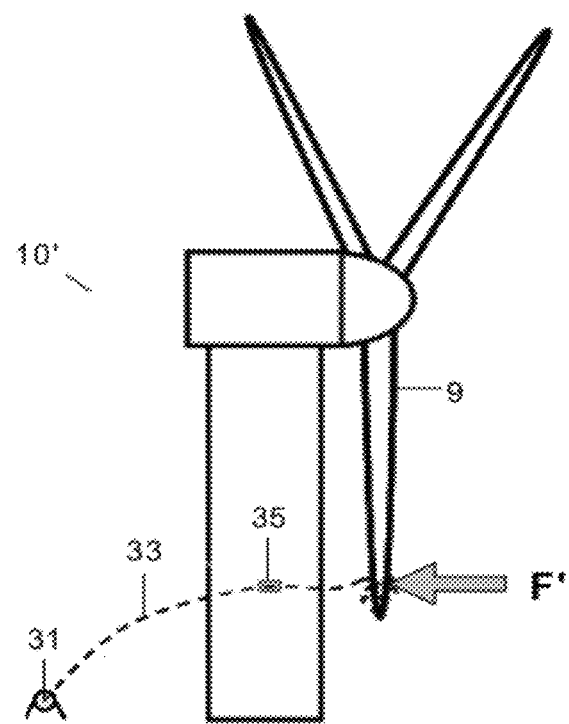
FIG. 8 shows the equipment used for performing a bending stiffness test to a blade installed in a wind turbine according to the present invention.

In the last case (with the blade mounted at the wind turbine) the test is performed with the blade 9 mounted on a wind turbine and positioned in a flapping direction or in an edge direction (moving the blade with the pitch actuators) using the equipment shown in FIG. 8 comprising an electric motor 31 on the ground, a pulley 35 attached to the tower, and a rope 33 that allows that the blade 9 can be subject to a deflecting force F.

Longitudinal Mass Distribution Test

After performing the above mentioned bending stiffness test (preferably the flapping bending stiffness test) at the factory it could be performed a test addressed to obtain the longitudinal mass distribution of the blade in a suitable test bench as follows.

Figure 6:
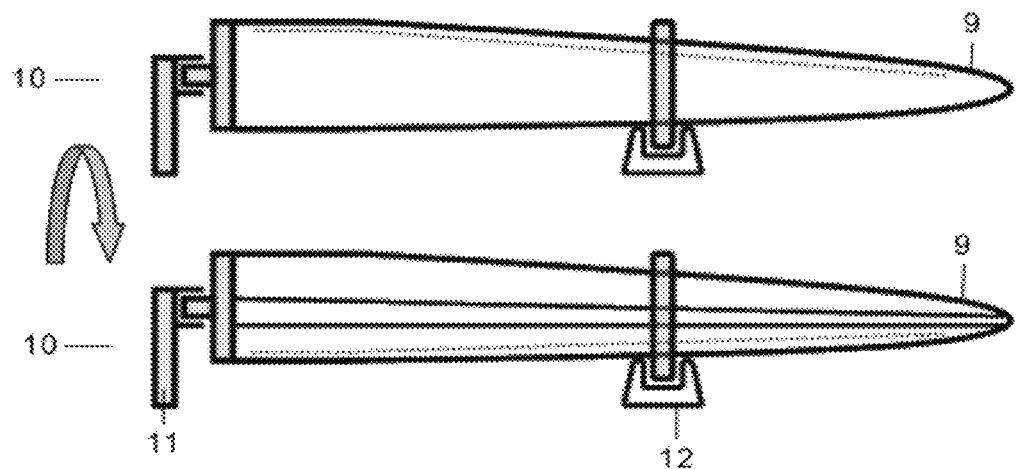
FIG. 6 shows the test bench used in the longitudinal mass distribution test according to the present invention.

The blade 9 shall be placed in the test bench 10 (see FIG. 6) over the fixed supports 11, 12 so that it can be rotated as indicated by arrow R in (preferably) a flapping position. Then, a measurement of the strains due to the own weight of the blade 9, that will be used as a first state, along the second cable 14 is done. After turning 180° the blade 9, a new measurement of the strains along the third cable 15 is done that will correspond, with respect to the first state, to the strains caused by twice the weight of the blade 9. The distribution of the longitudinal mass is deduced from the distribution of moments in each point of the blade 9 due to the own weight of the blade (that can be obtained from the previously obtained flapping bending stiffness distribution) and from the value of the measured strains.

It is preferred carrying out this test with the blade in a flapping position because the values of the measured strains are much bigger than in the edge position and, thus, the effect of noise in said measurements is less important.

Among others, this invention has the following advantages:

Provides a fast, simple and robust installation of the optical fibre needed for a variety of strain tests to be performed to the blade at the manufacturing plant as well as during its lifetime, allowing particularly the repetition of the same test in different moments of the blade lifetime.

Allows a continuous recording along the blade (one value every millimeter) of the bending stiffness in the main areas of the wind turbine blade and its longitudinal mass distribution.

Provides fast, simple and robust test methods for obtaining the bending stiffness in the main areas of a wind turbine blade and its longitudinal mass distribution at the manufacturing plant of the blade.

Provides fast, simple and robust test methods for obtaining the bending stiffness in the main areas of a wind turbine blade outside the manufacturing plant and also when it is installed in a wind turbine.

Although the present invention has been fully described in connection with preferred embodiments, it is evident that modifications may be introduced within the scope thereof, not considering this as limited by these embodiments, but by the contents of the following claims.

The invention claimed is:

1. A testing method for determining a distribution of a physical property along a wind turbine blade, said testing method comprising:

conducting dynamic tests that comprise the use of an equipment for measuring strain at multiple locations in mono-mode optical fibers using Rayleigh scattered light, an Optical Backscattering Reflectometer (OBR) interrogator, an interface device, and an Acquisition System, said mono-mode optical fibers being attached to the blade subjected to said tests for obtaining high spatial resolution measurements of the blade strain during said tests;

installing inside the blade a first mono-mode optical fiber along leading and trailing edges of an upper shell, installing a second mono-mode optical fiber over the inner central part of the upper shell, and installing a third mono-mode optical fiber on a side of a spar that is to be attached to the lower shell, leaving the first mono-mode optical fiber embedded in an upper shell, lower shell union, leaving the second mono-mode optical fiber embedded in an upper shell, spar union, and leaving the third mono-mode optical fiber embedded in a spar, lower shell union, wherein said first, second, and third mono-mode optical fibers have a free end for connection with an external equipment;

applying one or more loads to the blade;

obtaining a strain distribution produced by said one or more loads along the blade using the external equipment connected to the free end of at least one of said first, second, and third mono-mode optical fibers for measuring the strain using Rayleigh scattered light; and determining the distribution of said physical property from said strain distribution.

2. The testing method of claim 1, wherein said steps are performed with the blade mounted in a test bench comprising first and second fixed supports and means for rotating the blade.

3. The testing method according to claim 2, wherein:
said physical property is flapping bending stiffness;
the blade is placed in said test bench in a flapping position and a load (F) is applied in a blade section between said first and second fixed supports; and
strain measurements are carried out along said second and third mono-mode optical fibers.

4. The testing method according to claim 3, further comprising the following step:
comparing said flapping bending stiffness distribution of the blade mounted on the test bench with a flapping bending stiffness distribution of the blade determined outside a blade factory before the blade is mounted on the wind turbine.

5. The testing method according to claim 2, wherein:
said physical property is edge bending stiffness;
the blade is placed in said test bench in an edge position and a load (F) is applied in a blade section between said first and second fixed supports; and
strain measurements are carried out along said first mono-mode optical fiber.

6. The testing method of claim 1, further comprising the step of comparing the distribution of said physical property with its design distribution.

7. The testing method of claim 6, wherein the test bench is a wind turbine and an external device is used for applying one or more loads in a section close to a tip of the blade.

8. The testing method according to claim 7, wherein said external device is a rope attached to a blade section close to the tip of the blade which is driven by a motor placed on the ground and guided by a pulley fixed to a wind turbine tower.

9. A testing method for determining a distribution of a physical property along a wind turbine blade, said testing method comprising:

conducting dynamic tests that comprise the use of an equipment for measuring strain at multiple locations in mono-mode optical fibers using Rayleigh scattered light, an Optical Backscattering Reflectometer (OBR) interrogator, an interface device, and an Acquisition System, said mono-mode optical fibers being attached to the blade subjected to said tests for obtaining high spatial resolution measurements of the blade strain during said tests;

installing inside the blade a first mono-mode optical fiber along the leading and trailing edges of an upper shell, installing a second mono-mode optical fiber over the inner central part of the upper shell, and installing a third mono-mode optical fiber on a side of a spar that is to be attached to the lower shell, leaving the first mono-mode optical fiber embedded in an upper shell, lower shell union, leaving the second mono-mode optical fiber embedded in an upper shell, spar union, and leaving the third mono-mode optical fiber embedded in a spar, lower shell union, wherein said mono-mode optical fibers have a free end for connection with an external equipment;

applying one or more loads to the blade in a test bench placed at the blade factory comprising first and second fixed supports and means for rotating the blade;

obtaining the strain distribution produced by said load or loads along the blade using a suitable external equipment connected to the free end of at least one of said mono-mode optical fibers for measuring the strain using Rayleigh scattered light;

determining the distribution of said physical property from said strain distribution; and comparing the distribution of said physical property with its design distribution.

10. The testing method according to claim 9, wherein:
said physical property is flapping bending stiffness;
the blade is placed in said test bench in a flapping position and a load is applied in a blade section between said first and second fixed supports; and
strain measurements are carried out along said second and third mono-mode optical fibers.

11. The testing method according to claim 9, wherein:
said physical property is edge bending stiffness;
the blade is placed in said test bench in an edge position and a load (F) is applied in a blade section between said first and second fixed supports; and
strain measurements are carried out along said first mono-mode optical fiber.

12. The testing method according to claim 9, wherein:
said physical property is longitudinal blade mass distribution;
the blade is placed in said test bench in a flapping position subjected to its own weight and first strain measurements are carried out along said second mono-mode optical fiber;
the blade is turned 180° in said test bench and second strain measurements are carried out along said third mono-mode optical fiber; and
the longitudinal blade mass distribution is determined from a previously obtained distribution of a flapping bending stiffness and from first and second strain distributions resulting from said first and second strain measurements, taking into account that, with respect to the first distribution, the second distribution is caused by twice the weight of the blade.

13. The testing method according to claim 10, further comprising the following steps:

applying one load to the blade in a test bench placed outside the blade factory;

obtaining the strain distribution produced by said load along the blade using the external equipment connected to the free end of said second and third mono-mode optical fibers for measuring the strain using Rayleigh scattered light;

determining the distribution of the flapping bending stiffness from said strain distribution; and comparing said flapping bending stiffness distribution with that determined at the blade factory.

14. The testing method according to claim 11, further comprising the following steps:

applying one load to the blade in a test bench placed outside the blade factory;

obtaining the strain distribution produced by said load along the blade using the external equipment connected to the free end of said first mono-mode optical fiber for measuring the strain using Rayleigh scattered light;

determining the distribution of the edge bending stiffness from said strain distribution; and comparing said edge bending stiffness distribution with that determined at the blade factory.

15. The testing method according to claim 13, wherein said steps are performed at any location outside the blade factory before mounting the blade in a wind turbine.

16. The testing method according to claim 13, wherein said steps are performed with the blade mounted in a wind turbine, wherein the test bench is the wind turbine, using an external device for applying the load in a section close to the tip of the blade.

17. The testing method according to claim 16, wherein said external device is a rope attached to a blade section close to the tip of the blade which is driven by a motor placed on the ground and guided by a pulley fixed to the wind turbine tower.

18. A testing method for determining a distribution of a physical property along a wind turbine blade, said testing method comprising:

conducting dynamic tests that comprise the use of an equipment for measuring strain at multiple locations in mono-mode optical fibers using Rayleigh scattered light, an Optical Backscattering Reflectometer (OBR) interrogator, an interface device, and an Acquisition System, said mono-mode optical fibers being attached to the blade subjected to said tests for obtaining high spatial resolution measurements of the blade strain during said tests;

installing inside the blade a first mono-mode optical fiber along the leading and trailing edges of an upper shell, installing a second mono-mode optical fiber over the inner central part of the upper shell, and installing a third mono-mode optical fiber on a side of a spar that is to be attached to the lower shell, leaving the first mono-mode optical fiber embedded in an upper shell, lower shell union, leaving the second mono-mode optical fiber embedded in an upper shell, spar union, and leaving the third mono-mode optical fiber embedded in a spar, lower shell union, wherein said mono-mode optical fibers have a free end for connection with an external equipment;

applying one or more loads to the blade;

obtaining a strain distribution produced by said one or more loads along the blade using the external equipment connected to the free end of at least one of said first, second, and third mono-mode optical fibers for measuring the strain using Rayleigh scattered light;

determining the distribution of said physical property from said strain distribution;

wherein said steps are performed with the blade mounted in a test bench comprising first and second fixed supports and means for rotating the blade;

wherein the test bench is a wind turbine and an external device is used for applying one or more loads in a section close to a tip of the blade; and wherein said external device is a rope attached to a blade section close to the tip of the blade which is driven by a motor placed on the ground and guided by a pulley fixed to a wind turbine tower.

* * * * *